US010277140B2

(12) United States Patent
Jia et al.

(10) Patent No.: US 10,277,140 B2
(45) Date of Patent: Apr. 30, 2019

(54) HIGH-BANDWITH RESONANT POWER CONVERTERS

(71) Applicant: Google LLC, Mountain View, CA (US)

(72) Inventors: Liang Jia, San Mateo, CA (US); Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/693,055

(22) Filed: Aug. 31, 2017

(65) Prior Publication Data

US 2019/0068071 A1  Feb. 28, 2019

(51) Int. Cl.
*H02M 3/335* (2006.01)
*H02M 1/14* (2006.01)

(52) U.S. Cl.
CPC ......... *H02M 3/33592* (2013.01); *H02M 1/14* (2013.01)

(58) Field of Classification Search
CPC .......... H02M 1/14; H02M 1/143; H02M 1/15; H02M 1/4241; H02M 3/33507; H02M 3/33546; H02M 3/33569; H02M 3/33592
See application file for complete search history.

(56) References Cited

U.S. PATENT DOCUMENTS

| | | |
|---|---|---|
| 4,785,387 A | 11/1988 | Lee et al. |
| 4,814,962 A | 3/1989 | Magalhaes et al. |
| 4,876,635 A | 10/1989 | Park et al. |
| 5,388,040 A | 2/1995 | Hall et al. |
| 5,438,498 A | 8/1995 | Ingemi |
| 5,640,082 A | 6/1997 | Lusher et al. |
| 5,684,678 A | 11/1997 | Barrett |
| 5,777,859 A | 7/1998 | Raets |

(Continued)

FOREIGN PATENT DOCUMENTS

| | | |
|---|---|---|
| EP | 0316892 | 5/1989 |
| EP | 1120891 | 8/2001 |

(Continued)

OTHER PUBLICATIONS

'en.wikipedia.org' [online] "Ceramic Capacitor," Last Updated on: Aug. 28, 2017, [retrieved on Aug. 31, 2017] Retrieved from Internet: URL<https://en.wikipedia.org/wild/Ceramic_capacitor> 21 pages.

(Continued)

*Primary Examiner* — Matthew V Nguyen
(74) *Attorney, Agent, or Firm* — Fish & Richardson P.C.

(57) ABSTRACT

This specification describes a device that includes a voltage-regulated DC-DC converter comprising a switching network, a resonant circuit, and control circuitry, wherein the switching network has a switching frequency. The DC-DC converter has an output impedance and the control circuity uses a control loop to control the DC-DC converter. The control circuitry implements the control loop using: an output voltage sensor configured to sense an output voltage of the DC-DC converter; and a compensator configured to adjust operation of the DC-DC converter based on the output voltage sensed by the output voltage sensor. The DC-DC converter comprises an output impedance suppression mechanism configured to at least partially suppress increases in the output impedance of the DC-DC converter.

22 Claims, 7 Drawing Sheets

(56) References Cited

U.S. PATENT DOCUMENTS

| | | | |
|---|---|---|---|
| 5,780,986 | A | 7/1998 | Shelton et al. |
| 5,781,418 | A | 7/1998 | Chang et al. |
| 5,805,432 | A | 9/1998 | Zaitsu et al. |
| 5,986,895 | A | 11/1999 | Stewart et al. |
| 6,081,439 | A | 6/2000 | Saint-Pierre et al. |
| 6,137,234 | A | 10/2000 | Willaert et al. |
| 6,151,231 | A | 11/2000 | Saint-Pierre et al. |
| 6,304,461 | B1 | 10/2001 | Walker |
| 6,344,979 | B1 | 2/2002 | Huang et al. |
| 6,400,582 | B1 | 6/2002 | Hemena et al. |
| 7,453,710 | B2 | 11/2008 | Baurle et al. |
| 7,746,670 | B2 | 6/2010 | Kawasaki et al. |
| 7,999,526 | B2 | 8/2011 | Ilic et al. |
| 8,395,914 | B2 | 3/2013 | Klootwikh et al. |
| 8,735,763 | B2 | 5/2014 | Hasimoto et al. |
| 9,001,539 | B2 * | 4/2015 | Oh .................. H02M 1/4241 363/125 |
| 9,048,727 | B2 | 6/2015 | Giuliano et al. |
| 9,059,636 | B2 | 6/2015 | Lehn et al. |
| 9,065,341 | B2 | 6/2015 | Murakami et al. |
| 9,281,753 | B2 | 3/2016 | Reddy |
| 9,318,968 | B2 | 4/2016 | Lehn |
| 9,391,524 | B2 * | 7/2016 | Oh .................. H02M 3/33507 |
| 2005/0207180 | A1 | 9/2005 | Pansier |
| 2007/0171679 | A1 | 7/2007 | Nielsen et al. |
| 2007/0236967 | A1 | 10/2007 | Liu et al. |
| 2008/0259647 | A1 | 10/2008 | Risseeuw |
| 2009/0034298 | A1 | 2/2009 | Liu et al. |
| 2012/0249059 | A1 | 10/2012 | Matsumae et al. |
| 2013/0181690 | A1 | 7/2013 | Holloway |
| 2014/0307483 | A1 | 10/2014 | Sigamani et al. |
| 2014/0334193 | A1 * | 11/2014 | Meyer .............. H02M 3/33584 363/21.01 |
| 2015/0023066 | A1 * | 1/2015 | Kawashima ...... H02M 3/33553 363/21.02 |
| 2015/0229225 | A1 * | 8/2015 | Jang .................. H02M 3/285 363/17 |
| 2015/0349562 | A1 | 12/2015 | Minegishi et al. |
| 2016/0162840 | A1 | 6/2016 | Roberts et al. |
| 2016/0294294 | A1 | 10/2016 | Ye et al. |
| 2016/0365795 | A1 | 12/2016 | Madsen et al. |

FOREIGN PATENT DOCUMENTS

| | | |
|---|---|---|
| EP | 3151400 | 4/2017 |
| WO | WO 2016037287 | 3/2016 |

OTHER PUBLICATIONS

'en.wikipedia.org' [online] "PID controller," Last Updated on : Aug. 31, 2017, [retrieved on Aug. 31, 2017] Retrieved from Internet: URL<https://en.wikipedia.org/wild/PID_controller> 12 pages.

'www.cui.com' [online] "Compensation Methods in Voltage Regulators an Evolution from Analog to Digital," Nov. 2012, [retrieved on Aug. 31, 2017] Retrieved from Internet: URL<http://www.cui.com/catalog/resource/compensation-methods-in-voltage-regulators.pdf> 5 pages.

'www.digikey.com' [online] "A Review of Zero-Voltage Switching and its Importance to Voltage Regulation," Steven Keeping, Aug. 5, 2014, [retrieved on Aug. 31, 2017] Retrieved from Internet: URL<https://www.digikey.com/en/articles/techzone/2014/aug/a-review-of-zero-voltage-switching-and-its-importance-to-voltage-regulation> 6 pages.

'www.digikey.com' [online] "The Rose of Slope Compensation in Current-Mode-Controlled Voltage Regulators," Steven Keeping, Jan. 20, 2015 [retrieved on Aug. 31, 2017] Retrieved from Internet: URL<https://www.digikey.com/en/articles/techzone/2015/jan/the-role-of-slope-compensation-in-current-mode-controlled-voltage-regulators> 4 pages.

'www.eetimes.com' [online] "LLC resonant topology lowers switching losses, boosts efficientcy," Carl Walding, Aug. 28, 2008 [retrieved on Aug. 7, 2017] Retrieved from Internet: URL<http://www.eetimes.com/document.asp?doc_id=1273871> 7 pages.

'www.onsemi.com' [online] "Analysis and Design of Quasi-Square Wave Resonant Converters," Powerpoint, Last update date: unknown [retrieved on Aug. 31, 2017] Retrieved from Internet: URL<https://www.onsemi.com/pub/Collateral/TND348-D.PDF> 63 slides.

'www.pdx.edu' [online] "Input and output Impedance, PH-315" A. La Rosa, 2013, [retrieved on Aug. 30, 2017] Retrieved from Internet: URL<https://www.pdx.edu/nanogroup/sites/www.pdx.edu.nanogroup/files/2013_Input_output_impedance_9.pdf> 20 pages.

'www.st.com' [online] "An2644 Application Note: An introduction to LLC resonant half-bridge converter," Sep. 2008 [retrieved on Aug. 30, 2017] Retrieved from Internet: URL<http://www.st.com/content/ccc/resource/technical/document/application_note/de/f9/17/b7/ad/9f/4d/dd/CD00174208.pdf/files/CD00174208.pdf/jcr:content/translations/en.CD00174208.pdf > 64 pages.

'www.st.com' [online] "L6591: PWM controller for ZVS half bridge," Aug. 2012 [retrieved on Aug. 31, 2017] Retrieved from Internet: URL<http://www.st.com/content/ccc/resource/technical/document/datasheet/13/33/01/0d/bc/2c/4d/0d/Cd00201721.pdf/files/CD00201721.pdf/jcr:content/translations/en.CD00201721.pdf> 41 pages.

Abdel-Rahman "Chapter 6 Soft-Switching dc-dc Converters outlines," Chapter 6 Lecture 1 EEL6246 Power Electronics II, Florida Power Electric Center, University of Central Flordia, 13 slides.

Arrigo. "Input and Output Capacitor Selection," Texas Instruments Application Report, SLTA055, Feb. 2006, 11 pages.

Carter. "High-speed notch filters," Analog Applications Journal, Texas Instruments Incorporated, 2006, 8 pages.

Choi. "Charge current control for LLC resonant converter," IEEE Applied Power Electronics Conference and Exposition, Mar. 15-19, 2015, 5 pages.

Hu et al. "Bang-Bang Charge Control for LLC Resonant Converters," IEEE Transaction on Power Electronics, 20(2), Feb. 2015, 16 pages.

Hu et al. "Bang-Bang charge control for LLC resonant converters," Proceedings of Energy Conversion Congress and Exposition, Sep. 2013, 7 pages.

Huang. "Feedback Loop Design on an LLC Resonant Power Converter," Texas Instruments, Application Report SLUA582A, Revised Nov. 2010, 9 pages.

Jang et al. "A New Three-Level Soft-Switched Converter," 18th Annual IEEE Applied Power Electronics Conference and Exposition, Feb. 2003, 7 pages.

Lin et al. "Analysis and implementation of a new soft switching DC/DC PWM converter," IET Power Electronics, 6(1) Jan. 2013, 12 pages.

Pilawa-Podgurski et al. "Very High Frequency Resonant Boost Converters," IEEE Transaction on Power Electronics 24(6), Jun. 2009, 7 pages.

Ranjitha et al. "Soft Switching with Cascaded Transformers to Drive the PMDC Motor." International Journal of Advanced Research in Electrical, Electronics and Instrumentation Engineering 4(2), Feb. 2015, 8 pages.

Shanthi et al. "A Simple Design and Simulation of Full Bridge LLC Resonant DC-DC Converter for Pv Applications," Middle-East Journal of Scientific Research 23(2) 2015, 8 pages.

Tang. "Average current-mode control and charge control for pWM converters," PhD dissertation, Virginia Tech, 1994, 189 pages.

Vavilala et al. "Implementation of PWM Soft Single Switched DC-DC Converters with Coupled Inductors," Recent, 15(1), Mar. 2014, 11 pages.

Yang. "Chapter 4: LLC Resonant Converter," Topology investigation of front end DC/DEC converter for distributed power system, PhD dissertation, Sep. 12, 2003, 48 pages.

Yang. "Chapter 6: Small signal analysis and control design of LLC converter," Topology investigation of front end DC/DC converter for distributed power system, PhD dissertation, Sep. 12, 2003, 50 pages.

Yu et al. "Driver Based Soft Switch for Pulse-Width-Modulated Power Converters," PhD Dissertation, Virginia Polytechnic Institute and State University, Feb. 23, 2005, 187 pages.

Zhang et al. "Modeling and Loop Compensation Design of Switching Mode Power Supplies," Application Note 149, Linear Technology, Jan. 2015, 22 pages.

(56) References Cited

OTHER PUBLICATIONS

International Search Report and Written Opinion issued in International Application No. PCT/US2018/028799, dated Jun. 12, 2018, 13 pages.
International Preliminary Report on Patentability issued in International Application No. PCT/US2018028799, dated Oct. 12, 2018, 15 pages.

* cited by examiner

HIGH-BANDWITH RESONANT POWER CONVERTERS

FIELD

The present specification is related to power converters for providing regulated power to a load.

BACKGROUND

Consumer electronic devices and computing systems for datacenters use power adapters to convert the power source with one level of voltage and current to another power level that is adapted to power the electronic devices and systems. Moreover, these power adapters include power conversion circuits that have multiple, semiconductor devices, resistive, capacitive, and inductive components. These components cooperate to adjust, for example, a high voltage received by the power adapter to a lower voltage having characteristics that are more suitable for powering specific electronic devices. While there are a variety of design approaches for producing power adapters, current power conversion circuits for these adapters may be somewhat large or and may have limited power conversion efficiency.

SUMMARY

This specification describes a power conversion system that includes hardware circuity for converting an alternating-current (AC) voltage signal to a direct-current (DC) voltage signal that can be used to power a load (e.g., one or more electronic devices). The described power conversion system is configured to achieve high dynamic response, e.g., a high loop bandwidth, as well as a high conversion efficiency. To achieve a high efficiency, resonant circuity, such an inductor-inductor-capacitor (LLC) tank can be used. The power conversion system can achieve a high bandwidth and favorable phase margin by at least partially suppressing output impedance for signals at or near a switching frequency of the converter. This can allow the power conversion system to maintain a stable, regulated output voltage even when power demands of load device change frequently and rapidly.

Many power adapters, including those used with consumer electronics devices, include bulk capacitors at the input and output of a converter. The input capacitor helps to reduce the input ripple from the front-end stage, for example, an AC-DC rectifier or a DC-DC converter. If the input capacitance is too small, the input ripple can pass through to the output and degrade the output voltage regulation and power quality. Output capacitance is also important to provide an appropriately low output impedance to the load, and to reduce the transient voltage ripples. Typical power adapters require the input and output capacitors to each provide a relatively large amount of capacitance. As a result, the input and output capacitors often take up a large amount of space in the adapters, when smaller adapters are preferred.

The high-bandwidth converters and other techniques discussed in this document can facilitate high-density and high-efficiency power adapter design. For example, by increasing the bandwidth of the converter relative to prior designs, the amount of capacitance needed at the input and output of the converter can be reduced. Consequently, the physical size of the capacitors can also be reduced, allowing for a much smaller power adapter. The high responsiveness of the converter can maintain a regulated output voltage and supply the power needed to respond to transient demands high-frequency changes in load. Using a high-bandwidth converter, the input power supply rejection ratio (PSRR) can be improved and cover a higher frequency, so that the input capacitance can be reduced without negative impact on output ripple. On the output side, a high-bandwidth converter can also suppress the open loop output impedance to a higher frequency, so that output bulk capacitors can be replaced with smaller SMT ceramic capacitors.

Resonant converters, such as those of the LLC, series resonant, parallel resonant, series-parallel types, can provide a high conversion efficiency, but traditionally have not provided high bandwidth, due to the varying dynamic of a resonant tank that is a part of the resonant circuity. Even with improved controls, some resonant converters may exhibit spikes in a closed-loop output impedance at or near the switching frequency of the converter, resulting in limited loop bandwidth, otherwise a power conversion system may be destabilized and lead to a failure of voltage regulation and incorrect or fluctuating output voltages being provided to a load device.

The described power conversion system includes a resonant converter (e.g., a fixed-ratio LLC resonant converter) that provides high-bandwidth and includes an output impedance suppression mechanism. As discussed further below, a charge control technique can be used to control switching elements of the converter. The control technique can regulate the output voltage over a range of different current levels. This technique can provide increased bandwidth relative to pulse-width-modulation (PWM) or frequency modulation control. The resonant converter is configured to suppress output impedance spikes such that transient ripples associated with the DC output voltage signal are reduced during high frequency power conversion operations. Impedance spike suppression enables the power conversion system to be designed with substantially smaller capacitive devices relative to current systems, thereby reducing the size and complexity of the conversion circuitry.

The output impedance can be reduced or suppressed using any or all of various techniques discussed below. For example, a control loop of the converter can include a filter-based suppressor, such as a notch filter tuned for the switching frequency of the converter. As another example, the control loop of the converter may include a zero-order hold mechanism to avoid high frequency fluctuations in the control loop. As another example, the converter can include a decoupling network at the output that has a resonant frequency at or near the switching frequency of the converter. The decoupling network can include one or more capacitors having a self-resonant frequency at or near the switching frequency of the converter. As a result of the closed-loop output impedance suppression mechanism(s), the converter can operate at much higher bandwidth and improved phase margin than without these mechanisms. For example, the converter can maintain stability of the control loop and the output voltage for higher levels and frequencies of load demand fluctuations. The increased bandwidth can reduce the amount of capacitance needed at the input and output of the converter, which can allow the use of surface mount technology (SMT) capacitors that provide a substantially smaller component footprint relative to bulk capacitors of traditional power conversion systems.

One aspect of the subject matter described in this specification can be embodied in a device including: a voltage-regulated DC-DC converter comprising a switching network, a resonant circuit, and control circuitry, wherein the switching network has a switching frequency, and wherein the voltage-regulated DC-DC converter has an output impedance; wherein the control circuitry uses a control loop to control the voltage-regulated DC-DC converter, the control circuitry implementing the control loop using: an output voltage sensor configured to sense an output voltage of the voltage-regulated DC-DC converter; and a compensator configured to adjust operation of the voltage-regulated DC-DC converter based on the output voltage sensed by the output voltage sensor; and wherein the voltage-regulated DC-DC converter comprises an output impedance suppression mechanism configured to at least partially suppress increases in the output impedance of the voltage-regulated DC-DC converter.

These and other implementations can each optionally include one or more of the following features. For example, in some implementations, the output impedance suppression mechanism is configured to at least partially compensate for an output impedance spike occurring at the switching frequency. In some implementations, the output impedance suppression mechanism comprises a notch filter in the control loop, the notch filter being tuned for the switching frequency. For example, the notch filter can have a center frequency of the notch that is within 15% of the switching frequency. As another example, the notch filter may be configured to attenuate signals at the switching frequency by at least a minimum amount, e.g., 10 dB, 20 dB, etc.

In some implementations, the output impedance suppression mechanism comprises an operational amplifier and an impedance network that provide the notch filter for the control loop. In some implementations, the output impedance suppression mechanism comprises a zero-order hold mechanism. In some implementations, the zero-order hold mechanism is configured to operate at a sampling rate of about twice the switching frequency.

In some implementations, the output impedance suppression mechanism comprises a decoupling network arranged in parallel with an output load of the voltage-regulated DC-DC converter, wherein the decoupling network has a resonant frequency within 10% of the switching frequency. In some implementations, the decoupling network comprises a capacitor having a self-resonant frequency within 10% of the switching frequency due to a capacitance of the capacitor and an equivalent series inductance of the capacitor. In some implementations, the resonant circuit is an LLC tank. In some implementations, the resonant circuit is an LC or LLCC resonant circuit. In some implementations, the compensator comprises a proportional-integral (PI) controller or a proportional-integral-derivative (PID) controller.

In some implementations, the voltage-regulated DC-DC converter has a closed loop bandwidth that is about ⅓ of the switching frequency of the switching network and a phase margin of at least 45 degrees. In some implementations, the resonant circuit has a resonant frequency that is within 15% of the switching frequency of the switching network. In some implementations, the control circuitry for the voltage-regulated DC-DC converter implements charge control that controls switching of the switching network components based on a voltage of a capacitor of the resonant circuit.

In some implementations, the control circuitry controls the switching network to output a pulsed output to the resonant circuit; wherein the resonant circuit is an LLC tank; wherein the capacitor is a capacitor of the LLC tank; and wherein the control circuitry is configured such that, at switching times for MOSFETs in the voltage-regulated DC-DC converter, the voltage of the capacitor directly controls per-cycle input charge to the capacitor. In some implementations, the switching network comprises a switching rectifier operating at the switching frequency.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments and may result in one or more of the following advantages. The described circuit configurations can be implemented in voltage-regulating power supplies to obtain fast dynamic performance with reduced circuit complexity when compared to existing circuit designs. Impedance spikes that distort output voltage signals of the power supplies can be minimized to improved output voltage stability. The use of charge control to operate switching components of the power supplies can increase bandwidth of the power supplies. The power supplies can also include mechanisms for reducing closed-loop output impedance spikes that result from high-frequency load fluctuations. These output impedance suppression mechanisms can increase the stability of the control loop of the power supplies and enable voltage regulation with higher bandwidth and improved phase margin (relative to conventional power adapters). For example, in some implementations, a resonant converter can have a bandwidth of up to ⅓ of the switching frequency of the converter while also operating with improved phase margin.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
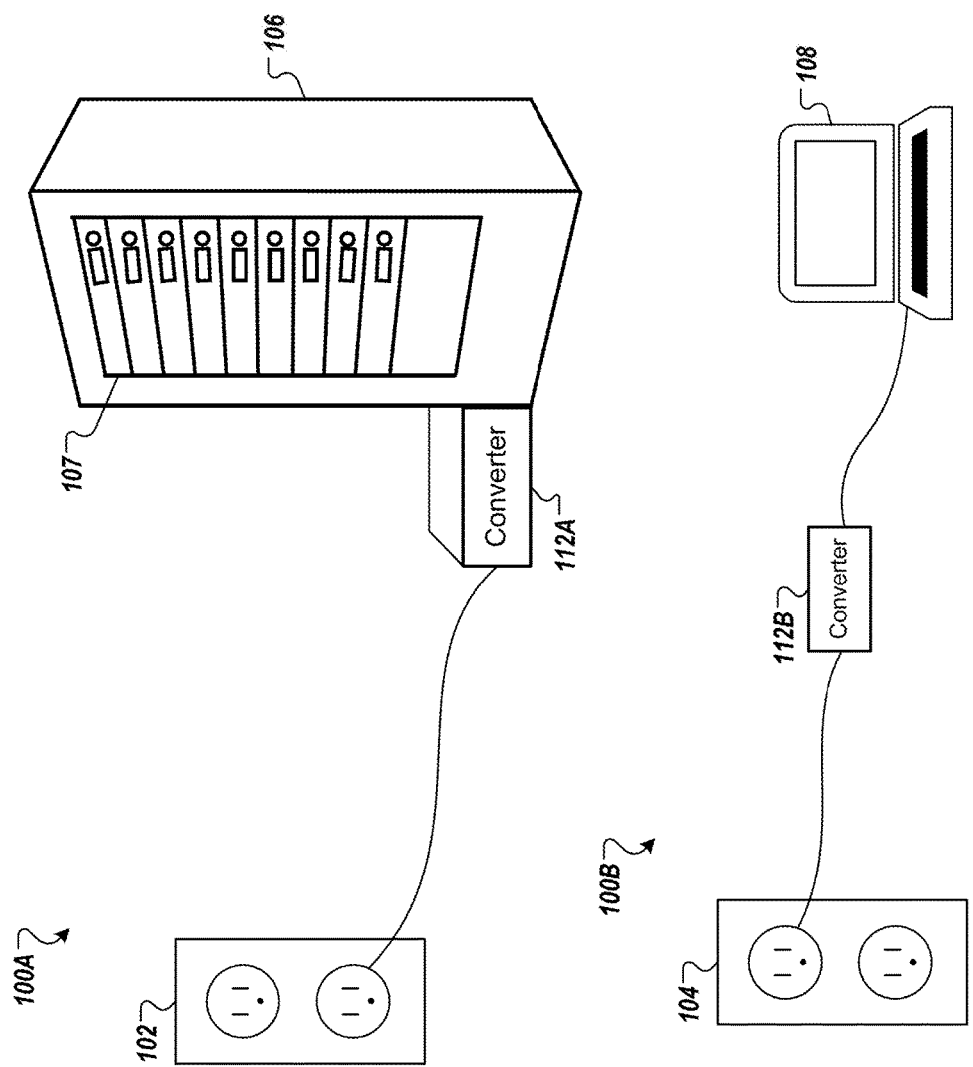
FIG. 1 is a diagram that illustrates examples of power converters for providing regulated power to an example load device.

FIG. 1 is a diagram that illustrates examples of power converters 112A/B for providing regulated power to example load devices. An environment 100A and an environment 100B are depicted at FIG. 1, where each environment 110A/B includes a power converter 112A/B intermediate a voltage source and an example electronic device. As shown by the two environments 110A/B, the power conversion techniques disclosed herein are applicable to large systems, such as servers and data centers, as well as to small devices, such as consumer devices, mobile devices, etc.

Environment 100A includes a voltage source 102 that provides an alternating-current (AC) voltage signal that can be used to power a load device 106. Environment 100A also includes a converter 112A that receives the AC voltage signal and converts the AC signal to a direct-current (DC) voltage. Although depicted as a plug or socket, voltage source 102 may be a rectifier device, including a DC-DC converter, that is located inside of an example load device (e.g., a server rack). For example, voltage source 102 may be distributed source that is present in a computing environment that includes one, or multiple, server racks. Voltage source 102 can be distributed in the computing environment via pipelines of power cables that connect to one or more junction boxes.

Load device 106 receives the converted DC voltage signal from converter 112A and uses the converted signal to power circuit components of load device 106. In some implementations, load device 106 is a rack-mounted server system that includes multiple computing servers 107, where each computing server includes multiple circuit components that can be powered using the converted DC voltage signal. In some instances, the converter 112A provides various voltage outputs received by each of the multiple computing servers 107 for powering the circuit components of each server 107. Signal characteristics of the respective voltage signals may differ depending on the power requirements of a receiving circuit component.

Similarly, environment 100B includes a voltage source 104 that also provides an AC voltage signal that can be used to power a load device 108. Environment 100B also includes a converter 112B that receives the AC voltage signal and converts the AC signal to a direct-current (DC) voltage. Load device 108 receives the converted DC voltage signal from converter 112B and uses the converted signal to power circuit components of load device 106.

Load device 106 can be an electronic device, such as a smartphone, a laptop computer, a desktop computer, a tablet device, a streaming device, a gaming console, a smart television, a display device, or any other electronic device. In some implementations, voltage source 102 and 104 each provide AC voltage signals that have the same, or substantially the same, signal characteristics (e.g., 120V, 60 Hz). In other implementations, source 102 provides an AC voltage signal having signal characteristics (e.g., 120V, 60 Hz) that are different than signal characteristics of an AC voltage signal provided by source 104 (e.g., 220V, 50 Hz).

As described in more detail below, converters 112A/B are energy efficient power adapters having circuit components arranged for converting voltage signals with high bandwidth (e.g., high responsiveness) and with greater efficiency relative to traditional power adapters. Moreover, converters 112A/B each provide improved voltage regulation over a wider range of load conditions. For example, the control loops for resonant converters of the converters 112A/B can have improved stability for frequencies at or near the switching frequencies of the converters 112A/B, relative to traditional power adapters. This can allow the converters 112A/B to provide consistent, regulated output voltages when supplying power to loads with transient and high-frequency variations in power demand.

In some implementations, each server 107 can include a DC power distribution system. In particular, a server 107 can receive 48V DC output from converter 112A. The DC power distribution system can be used to convert the received 48V to, for example, 1V, 3.3V, 5V, or 12V. These respective voltage signals can be used to power different electronic components that are located on the motherboard of server 107. In this implementation, the described teachings can be used to improve the dynamic performance of these DC power distribution systems (e.g., on-board power converters). Moreover, efficiency of these on-board converters can be improved and a size of the input and output capacitors can be reduced to improve power density features of the converter. Such improvements can translate to lower implementation costs of a server rack for a particular workload. For example, instead of fitting in 100 servers 107 per server rack 106, use of the described teachings can result in fitting 120 servers 107 per server rack 106.

Figure 2:
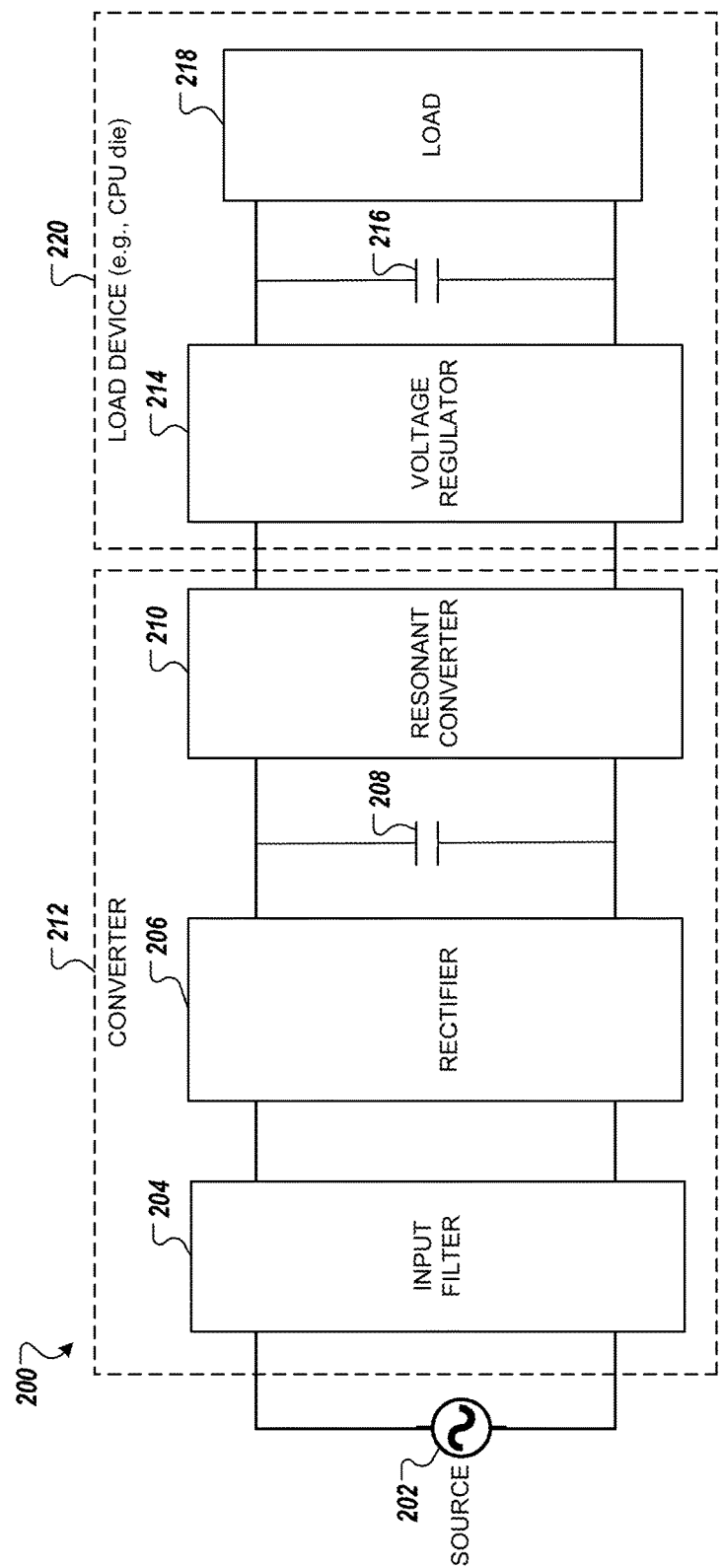
FIG. 2 is a diagram that illustrates an example conversion circuit of a power converter for providing regulated power to a load.

FIG. 2 is a diagram that illustrates an example conversion circuit 200 of a power converter for providing voltage-regulated power to a load. Circuit 200 includes a voltage source 202, a converter 212, and a load device 220. The converter 212 includes an input filter 204, a rectifier 206, a capacitor 208, and a resonant converter 210 that each cooperate to convert AC signals received from the source 202 to a regulated DC output voltage. This power converter 212 is an example of the power converters 112A/B described above. The load device 220 includes a voltage regulator 214, a capacitor 216, and a load 218. In some implementations, the load device 220 is a central processing unit (CPU) module located on a circuit board of a server 107 or other load device 108.

As noted above, traditional power conversion systems often include input and output bulk capacitors. Input and output capacitors are used to reduce input ripples caused by a front-end stage of a power converter. For example, a front-end stage of a power converter can include an AC-to-DC rectifier or a DC-to-DC converter, and the input and output capacitors are used to reduce or suppress input ripples that result from rectifier or conversion operations. If capacitance at the input is too small, ripples will pass through to the converter output and degrade an output voltage and power quality. Sufficient output capacitance is also needed to provide low enough output impedance to the load to avoid output fluctuations due to transient load demands. An output capacitor can also supply current to respond to transient demand and demand fluctuations higher than the bandwidth or control response capability of the converter. Typical bulk capacitors occupy a high percentage of space on circuit boards inside power adapters. As a result, the need for capacitors with high capacitance can result in large overall sizes of power adapters.

The inefficiencies of some traditional power conversion systems can also cause a problem for reducing the size of power adapters. For example, a standard flyback converter is only about 90% efficient. The inefficiencies during voltage conversion may require heat sinks or larger converter sizes to dissipate the waste energy, otherwise the exterior temperature of the converter may exceed safety and reliability standards.

Compared with standard flyback converters, resonant converters, such as LLC converters, have a superior efficiency (e.g., >90%) and a high step ratio capability. This makes the LLC converter a suitable design for many applications, including server systems and consumer electronics. The LLC converter model is not easy to control under varying load conditions, however. Although the efficiency is often high, the compensation needed to regulate the output of the LLC converter is often limited to a small fraction of the switching frequency of the converter, e.g., around 1/30 of the switching frequency.

Referring still to FIG. 2, the resonant converter 210 can combine the benefits of high voltage conversion efficiency of resonant converters with an increased bandwidth that exceeds that of prior resonant converters. The high bandwidth of the resonant converter 210 allows the converter 212 to use smaller input and output capacitance, and thus smaller-sized capacitors, to reduce the total size of the converter 212.

One of the ways that the resonant converter 210 can achieve a high bandwidth is using a control technique referred to herein as charge control. At least some of the switching elements of the resonant converter 210 can be controlled based on a voltage of a capacitor of the resonant circuit, e.g., a series resonant capacitor of an LLC tank. This technique can reduce the order of the tank from second order to first order within the frequency range of greatest interest. The result is that two low frequency poles of the LLC converter becomes a double pole located at a single frequency, e.g., the switching frequency of the resonant converter 210. This can increase bandwidth of the converter 210 to roughly 1/6 to 1/7 of the switching frequency. As described in more detail below, the charge control technique can incorporate a modulator sample/hold effect to achieve the double pole at a switching frequency of the resonant converter 210.

To achieve an even greater bandwidth of the resonant converter 210, an output impedance suppression is used to reduce the effects of the double pole. Without a suppression mechanism, the closed-loop output impedance for the feedback control loop gain of the converter 210 spikes at the frequency of the double pole, e.g., the switching frequency of the resonant converter 210. In other words, at the switching frequency, the closed-loop output impedance diverges from and is significantly higher than the open loop output impedance. This means that switching or other fluctuations of the load at or near the pole frequency may cause loss of stability of the resonant converter 210, e.g., by introducing oscillations or unpredictable behavior of the feedback control loop that compromise output voltage regulation.

With the output impedance suppression mechanisms discussed further below, the bandwidth of the resonant converter 210 is increased with improved phase margin and stability of the control loop of the resonant converter 210 also being increased. For example, in some implementations, the resonant converter 210 has a bandwidth up to and including 1/3 of the switching frequency of the resonant converter 210. For example, a resonant converter 210 with a switching frequency of 165 kHz can have a bandwidth of 55 kHz with a greater than 45-degree phase margin. In some implementations, the phase margin is 60 degrees or higher.

The high-bandwidth converter techniques enable adapter designs that can achieve higher density power output relative to conventional power converters. For example, the high bandwidth allows a reduction in input and output capacitance requirements, allowing for fewer or smaller capacitors to be used in the converter 212. The input power supply rejection ratio (PSRR) can be improved and a power adapter or supply can be capable of regulating output across a higher frequency band. This enables input capacitance of a power adapter to be reduced without a negative impact on stability of the output.

As used herein, bandwidth of a power converter refers to a closed loop gain cross-over frequency, e.g., a frequency at which the gain of the feedback control loop of the converter 210 reaches zero (e.g., crosses from positive to negative). This bandwidth represents a frequency range, e.g., from 0 Hz to the cross-over frequency, of changing load demands for which, if the control loop is stable, the converter can maintain regulated output. Also, if the load is changing at, or beyond, the crossover frequency, the load will need to be supported by sufficient output capacitance. In addition to improvements in bandwidth, the described high-bandwidth converter techniques enable adapter designs that can achieve a greater than 45-degree phase margin for various operating conditions. In general, phase margin refers to how many degrees the phase of the loop is above −180 degrees, measured at the cross-over frequency where gain crosses 0 dB. In some implementations, the phase margin achieved can be greater than 45 degrees or greater than 60 degrees, with a cross-over frequency of up to 1/3 of the switching frequency of the converter.

The high-bandwidth converters described herein can be used in advanced computing applications that are implemented using complex load devices, such as central processing units (CPU), graphical processing units (GPU), network switches, and accelerators, that may have large energy requirements (e.g., 100+ Amps). Due to the high current and dynamic characteristics of load profiles, components of circuit 200 should be configured to achieve fast dynamic response necessary to provide regulated output voltages that meet performance requirements of all devices in a dynamic load profile. If output voltages do not meet performance requirements, load devices may operate abnormally or experience damage.

Figure 3:
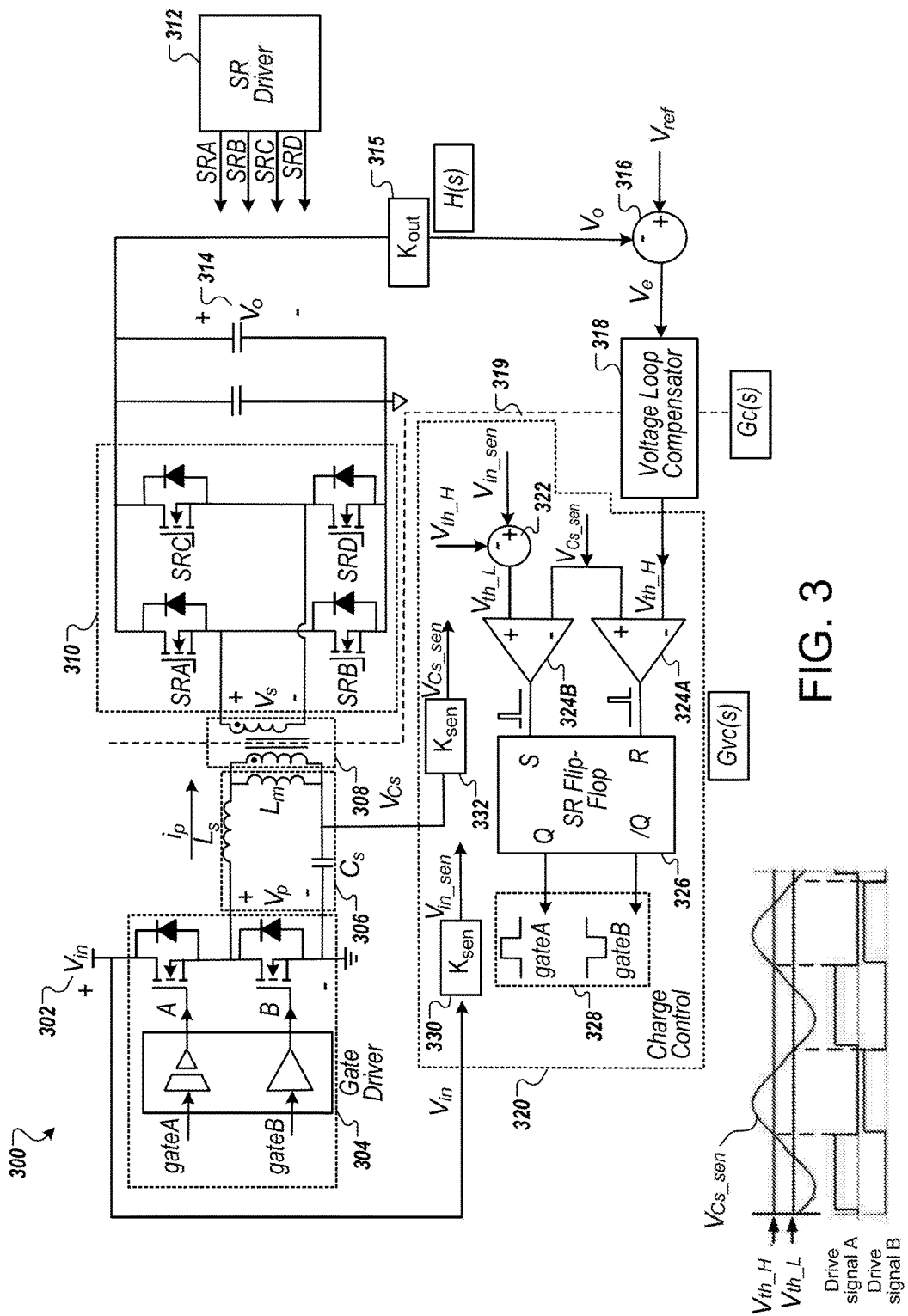
FIG. 3 is a diagram that illustrates an example of a resonant converter that includes LLC circuitry and charge control circuitry.

FIG. 3 is a diagram that illustrates a resonant converter 300 that represents an example of a resonant circuit 210 described above with respect to FIG. 2. The resonant converter 300 includes a switching circuit 304, a resonant tank circuit 306, a transformer 308, a switching circuit 310, and control circuitry 320. The resonant converter 300 receives a DC input from a DC voltage source 302. For example, the resonant converter 300 can receive a DC voltage signal output by the rectifier 206 of FIG. 2.

The switching circuit 304 is controlled by the control circuitry 320 to produce a pulsed output. In the example, the switching circuit 304 is a switching half-bridge circuit that includes two transistors, e.g., transistor A and transistor B, and a gate driver circuit (described below). The pulsed output can be a quasi-square wave, e.g., a pulsed DC output in which the cycle timing and pulse width vary. The control circuitry 320 can use a charge control technique to drive the transistors of the switching circuit. During operation of resonant converter 300, the control circuitry 320 provides signals at the respective gates of transistor A and transistor B to control current flow at the source of transistor A and at the source of transistor B. In some implementations, resonant converter 300 includes one or more metal oxide semiconductor field effect transistors (MOSFETs).

The output of the switching circuit 304 is provided to the resonant circuit 306. In general, the resonant circuit 306 can be a circuit that includes a network of inductors and capacitors that resonates at a particular frequency. In the example, the resonant circuit 306 is an LLC resonant tank circuit that two inductors ("LL") and one capacitor ("C"). In particular, the resonant circuit 306 includes a series resonant capacitor $C_s$, a series resonant inductor $L_s$, and a parallel inductor $L_m$. Other types of resonant circuits can be uses, such an LC circuit, an LLCC circuit, etc. The resonance of the circuit generates a substantially alternating current source for the transformer 308.

In operation, the resonant tank circuit 306 is excited with the pulsed output voltage from the switching circuit 304 such that a current ($I_p$) resonates during a switching cycle. A difference between a resonant current of tank circuit 306 and a magnetizing current passes through transformer 308 to the rectifier circuit at the secondary side of converter 300, and power is delivered to an example load 218 described above.

The transformer 308 has a primary winding that receives AC input from the resonant circuit 306. For example, the primary winding may be coupled in parallel to the parallel inductor $L_m$. In some implementations, parallel inductor $L_m$ corresponds to the magnetizing current of transformer 308 and may represent part of the transformer 308 rather than being included in converter 300 as a separate component. The transformer 308 performs voltage conversion at a single fixed ratio, e.g., a ratio of the input 20:1, 30:1, or 40:1, etc. Thus AC input voltage at the primary winding of the transformer 308 may be adjusted, e.g., stepped down, to produce a lower AC output voltage at the secondary winding of the transformer 308. Other types transformers can be used, including transformers with a center tap.

The AC output at the secondary winding of the transformer 308 is provided to the switching circuit 310. The second switching circuit 310 can be a rectifier to produce a DC output from the AC output at the transformer's secondary winding. For example, the switching circuit 310 can be a full bridge synchronous rectifier as illustrated. The switching circuit of claim 1 includes four transistors SRA, SRB, SRC, and SRD that are each driven by voltage signals generated by a driver 312. Other types of rectifiers, such as a center tapped rectifier, may be used instead of the rectifier configuration illustrated. The driver 312 can operate the synchronous rectifier or other arrangement used for the second switching circuit 310 at or near the resonant frequency of the resonant circuit 306. For example, the switching frequency for the second switching circuit 310 can be a switching frequency $f_{sw}$, which can be within about 15% of the resonant frequency of the resonant circuit 306 and is preferable slightly higher than the resonant frequency. This switching frequency $f_{sw}$ for the second switching circuit may be fixed or variable. In some instances it is set by the charge control system, so that the switching frequency for the first switching circuit 310 and the second switching circuit 310 are the same. The switching frequency can refer to the frequency at which an on/off cycle repeats, e.g., with a cycle beginning at each rising edge of a pulse.

Output of the switched circuit 310 is filtered by one or more decoupling capacitors 314 and provided as the output, $V_o$, of the converter 300. The full-bridge circuit at the secondary side of converter 300 can be a synchronous rectifier (SR) with a switching circuit 310. The capacitors 314 can filter the rectified current and converter 300 can output a converted DC voltage, $V_o$, based on the DC voltage of source 302 ($V_{in}$). To summarize the operation of the converter 310, the switching circuit 304 uses control signals from circuitry 320 to generate a pulsed or quasi-square wave voltage signal to excite resonant circuit 306. In response, the resonant circuit 306 generates an output resonant sinusoidal current. This resonant sinusoidal current is scaled and rectified at the secondary side of converter 300 using transformer 308 and a rectifier circuit 310. An output of the rectifier 310 is filtered and provided to a load.

The control circuitry 320 adjusts the operation of the converter 300 to regulate the output voltage, $V_o$, across varying levels of current and for different frequencies at which current demands may change. The control circuitry 320 uses a feedback control loop to detect and compensate for varying output characteristics of loads.

As described above, if resonant converter 300 is compensated to have loop bandwidth that approaches the switching frequency, converter 300 can experience high impedance spikes and other harmonic conditions. It is preferable for the switching frequency of the converter to be close to (e.g., within 15% of) the series resonant frequency of the LLC tank, and slightly above the series resonant frequency. When using charge control as discussed herein, bandwidth increases relative to the switching frequency, but the presence of a double pole limits loop stability. Impedance spikes due to the double pole can distort signal characteristics of the output voltage $V_o$, degrade the stability of converted DC output voltage, and compromise a power converter's ability to provide full scale power during high frequency switching load operations. Resonant converter 300 can include a control circuitry 320 for controlling charging characteristics of resonant circuit 306 during high frequency switching applications such that impedance spikes can be suppressed when the operating frequency nears the switching frequency.

For charge control operations, output voltage $V_o$ is sensed at sensing block 315 and a summer/adder 316 is used to sum the output voltage $V_o$ with a reference voltage $V_{ref}$. Summer/adder 316 performs a summing operation by adding a voltage parameter value of the $V_o$ voltage signal with a voltage parameter value of the $V_{ref}$ voltage signal to generate a voltage $V_e$. Voltage signal $V_e$ is provided to a voltage loop compensator 318. Compensator 318 can be a proportional-integral (PI) or a proportional-integral-derivative (PID) controller that provides a control loop feedback mechanism for establishing a continuously modulated control loop.

In some implementations, compensator 318 is implemented using an example opto-coupler that is configured to provide an isolation barrier 319 for isolating the primary side and the secondary side of converter 300. For example, an application of opto-coupler that forms compensator 318 is to provide isolation barrier 319 between two ground references, e.g., between a ground reference of the primary side and a ground reference of the secondary side of converter 300. Compensator 318 enables accurate and responsive corrections to charging characteristics of resonant converter 306 based on a particular control function. In particular, corrections to the charging characteristics are implemented and controlled using charge control circuitry 320.

Control circuitry 320 provides charge-mode control and is located at the primary side of resonant converter 300 with reference to isolation barrier 319. Rather than implement frequency modulation control or pulse width modulation control to achieve voltage regulation, the control circuitry 320 can use charge-mode control which uses a series resonant capacitor $C_s$ voltage signal (described below as $V_{Cs\_sen}$) to trigger switching actions of the half-bridge transistors A and B. Use of control circuitry 320 provides advantages that include fast dynamic performance and circuit implementations that have reduced complexity relative to other power adapters.

Regarding dynamic performance, using circuit 320, converter 300 can achieve a bandwidth attribute that is up to about ⅙ of the switching frequency for all, or substantially all, operating conditions. Moreover, for high frequency switching applications, power converters that include resonant converter 300 can achieve a broad range of current load step transients (e.g., 5 Amps to 25 Amps) at particular input-voltage conditions (e.g., 300 or 400 VDC).

Control circuitry 320 includes a summer/adder 322, a logic comparator 324A, a logic comparator 324B, and a flip-flop 326. In some implementations, sensing feature 315, summer/adder 316, and compensator 318 can be included in control circuitry 320. In the circuit of FIG. 3 for converter 300, output voltage $V_e$ of summer/adder 316 is determined or computed based on $V_o$ and $V_{ref}$ and provided to compensator 318. The output voltage signal of compensator 318 corresponds to $V_{th\_H}$ in control circuitry 320. In resonant converter 300, a sensed series resonant capacitor voltage, $V_{Cs\_sen}$, is be compared with $V_{th\_L}$ and $V_{th\_H}$ to dynamically vary the effective rate or switching frequency at which the switches A and B are switched. Typically, the variable rate is centered at the switching frequency $f_{sw}$, although the charge control thresholds can vary the pulse timing and pulse duration for each switching cycle of the switches A and B.

In some implementations, signal $V_{th\_H}$ in control circuitry 320 is used as a comparator voltage signal for generating another reference voltage $V_{th\_L}$, where $V_{th\_L}$ is generated based on a differential voltage between sensed voltage for source 302, $V_{in\_sen}$, that is sensed at sensing block ($V_{th\_L}=V_{in\_sen}-V_{th\_H}$).

The sensed voltage $V_{Cs\_sen}$, representing the voltage across the series resonant capacitor $C_s$, is compared with the thresholds $V_{th\_L}$ and $V_{th\_H}$ to switch the transistors A and B. Each of comparators 324A and 324B receives the sensed voltage signal, $V_{Cs\_sen}$, indicating the voltage at capacitor $C_s$. For example, comparator 324A is configured to compare the voltage signal $V_{th\_L}$ with the voltage signal $V_{Cs\_sen}$ to generate an input voltage signal received by flip-flop 326. Likewise, comparator 324B is configured to compare the voltage signal $V_{th\_H}$ with the voltage signal $V_{Cs\_sen}$ to generate an input voltage signal received by flip-flop 326.

Flip-flop 326 can be a set-reset (SR) latch device that is configured to store data parameters or variables that are indicative of a particular informational state of the flip-flop device using an applied input voltage. For example, flip-flop 326 can set, and change, states based on input voltage signals (e.g., respective signals from comparators 324A/B) and can generate respective output signals based on a particular state. The respective output signals are used by converter 300 to drive transistor A and transistor B at the primary side of converter 300. For example, a first signal, Q, is generated by the flip-flop 326 and is provided to a gate driver circuit 304 to control transistor A. A second signal, /Q, is generated by the flip-flop 326 and is provided to the gate driver circuit 304 to control transistor B. The second signal /Q can be the inverse or complement of the signal Q.

The gate driver circuit 304 provides a gate drive signal to transistor A based on the first signal (Q) of flip-flop 326. To generate this drive signal, the gate driver circuit 304 references to the source voltage for transistor A rather than referencing to ground. This can be referred to as a floating gate drive mechanism.

The gate driver circuit 304 also provides a gate drive signal to transistor B based on the second signal (/Q) of the flip-flop 326. The drive signal for transistor B does not require a floating gate drive, but the driver circuit 304 can perform a level shift relative to the output (/Q) of the flip-flop 326. For example, the driver circuit 304 can level shift the second signal (/Q) a signal amplification device that is used to scale or shift the signal. Gate B drives transistor B based on the level shifted signal (e.g., a level shift from 5V to 10V).

Using charge-control techniques, a per-cycle input charge of resonant circuit 306 can be directly controlled by using the series resonant capacitor voltage ($V_{Cs\_sen}$) to generate driver signals to switch the transistors A and B switching points.

Conventional frequency control has a varying dynamic model that, in some operating conditions, may exhibit a double pole effect. As noted above, the double pole can introduce rapid loop phase reductions and present challenges for compensation and achieving high-bandwidth. In conventional frequency control, the locations of the poles can vary as the load conditions and input voltage to the converter change, which makes control and compensation more difficult. Further, with conventional frequency control, the poles are sometimes at a lower frequency than the switching frequency, which highly limits bandwidth since it is very difficult for a converter's bandwidth to exceed the double pole frequency.

With charge control, the converter acts as a first-order system up to the switching frequency, rather than function as a second-order system as with conventional frequency control. As a result, with charge control, the double pole remains fixed at the switching frequency, regardless of changes in the load or input voltage. The control circuitry 320 enables a resonant power stage of resonant circuit 306 to become a first-order system up to the switching frequency, which is favorable for impedance suppression using a high-bandwidth loop compensation and can have an improved phase margin.

The described charge control mode includes controlling two voltage thresholds of circuit 320, $V_{th\_H}$ (high threshold) and $V_{th\_L}$ (low threshold) to define desired high and low resonant capacitor voltage ($V_{cs}$) threshold levels at the turn off points of switching transistors A and B. For example, as described above, $V_{cs}$ is compared with the two threshold voltage signals, $V_{th\_H}$ and $V_{th\_L}$. When a sensed voltage signal $V_{cs}$ crosses above the high threshold voltage $V_{th\_H}$, the transistor A is turned OFF and transistor B is turned ON. From this operating state, when the sensed voltage signal $V_{cs}$ crosses below the low threshold voltage $V_{th\_L}$, transistor A is turned ON and transistor B is turned OFF. This allows a per-cycle input charge can be directly controlled by voltage thresholds $V_{th\_H}$ and $V_{th\_L}$. As discussed, above, the compensator can dynamically adjust the voltage thresholds $V_{th\_H}$ and $V_{th\_L}$ as needed to meet the demands of the load.

In some implementations, both $V_{th\_H}$ and $V_{th\_L}$ are compared to sensed $V_{cs}$ using respective comparators 324A and 324B. When the sensed $V_{cs}$ is below $V_{th\_L}$, flip-flop 326 (e.g., set-reset (SR) latch) is SET, thus the low-side gate B is turned off and the high-side gate A is turned on. However, when the sensed $V_{cs}$ is above $V_{th\_H}$, flip-flop 326 is RESET, thus the high-side gate A is turned off and the low-side gate B is turned on. When the sensed $V_{cs}$ is between $V_{th\_L}$ and $V_{th\_H}$, both comparators 324A and 324B output logic LOW, and flip-flop 326 maintains the previous state.

In some implementations, circuit 320 can be used for other types of resonant converters that have series resonant inductors and capacitors, such as LC or LLCC converters. To further improve dynamic performance of resonant converter 300 using charge mode control enabled by circuit 320, this specification proposes a concept of using multiple techniques to suppress impedance spikes in the closed loop output impedance. Moreover, the described techniques can be used to achieve operating bandwidths that are at least ¼ or ⅓ of the switching frequency ($f_{sw}$) for all, or substantially all, operating conditions with a phase margin that maintains stability, e.g., at least 45 degrees, and in some implementations 60 degrees or more.

Figure 4A:
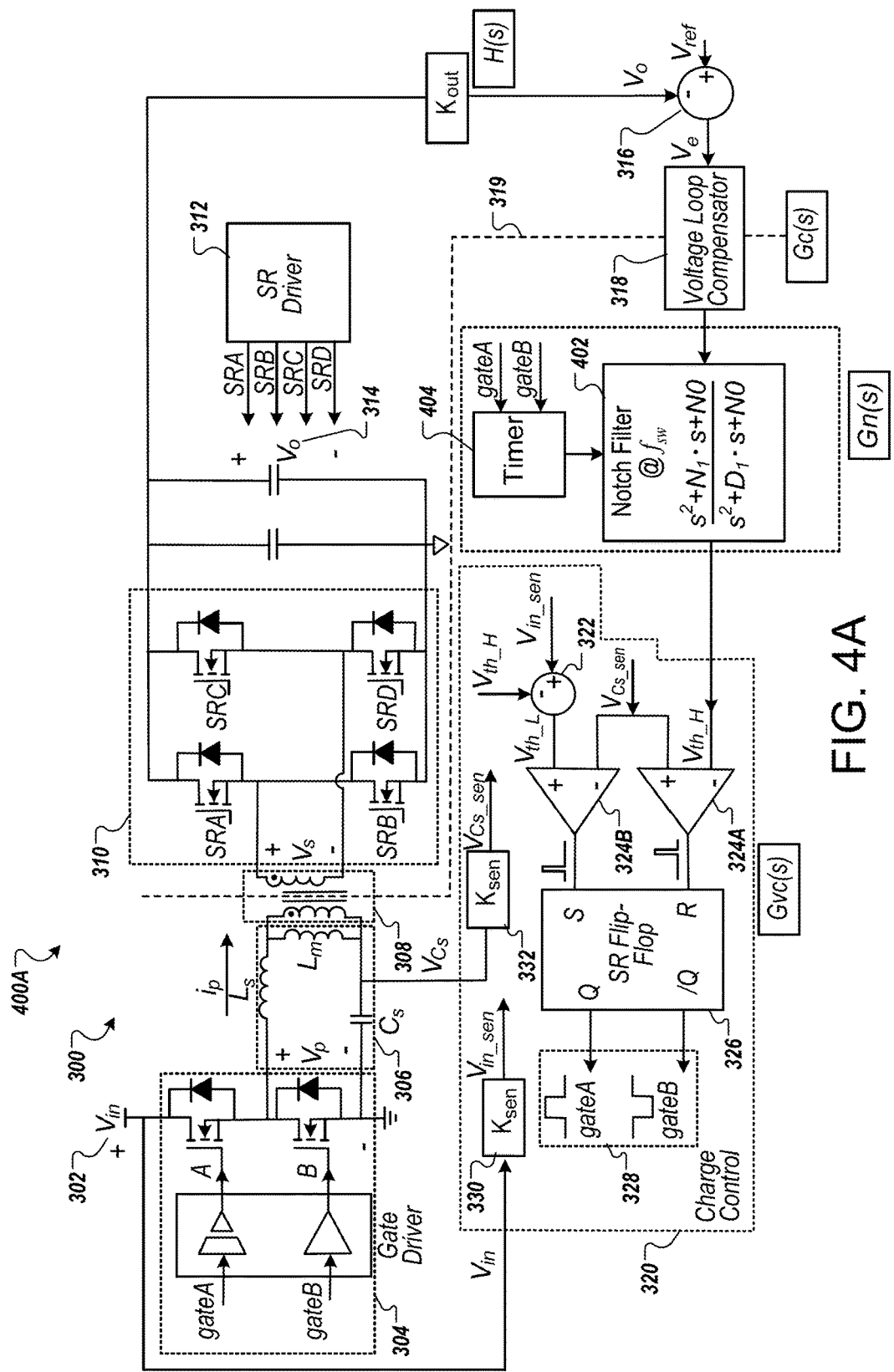
FIGS. 4A-4C are diagrams that illustrate examples of the resonant converter of FIG. 3 and respective circuitry for suppressing an output impedance of the resonant converter.
Figure 4B:
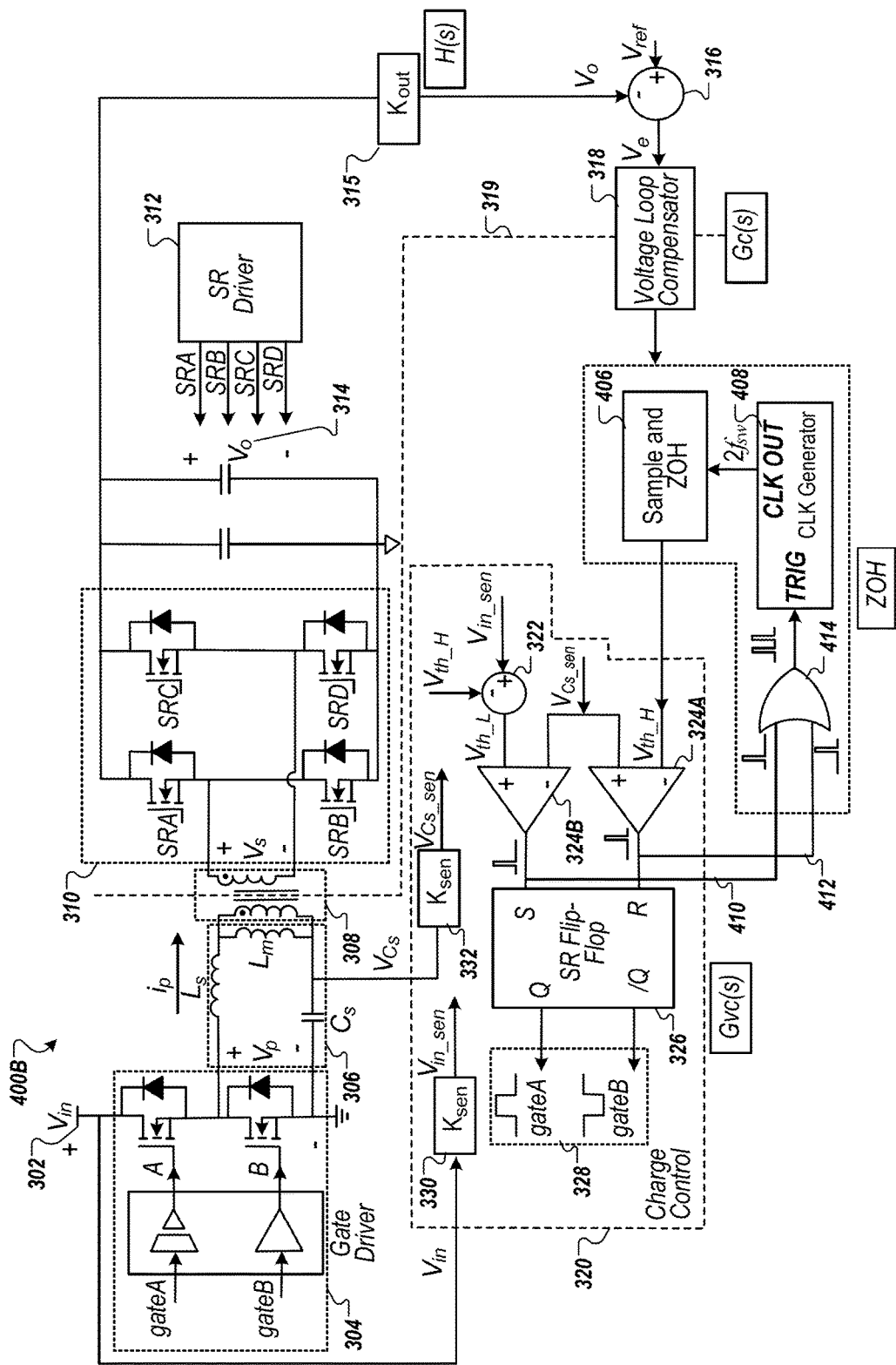
Figure 4C:
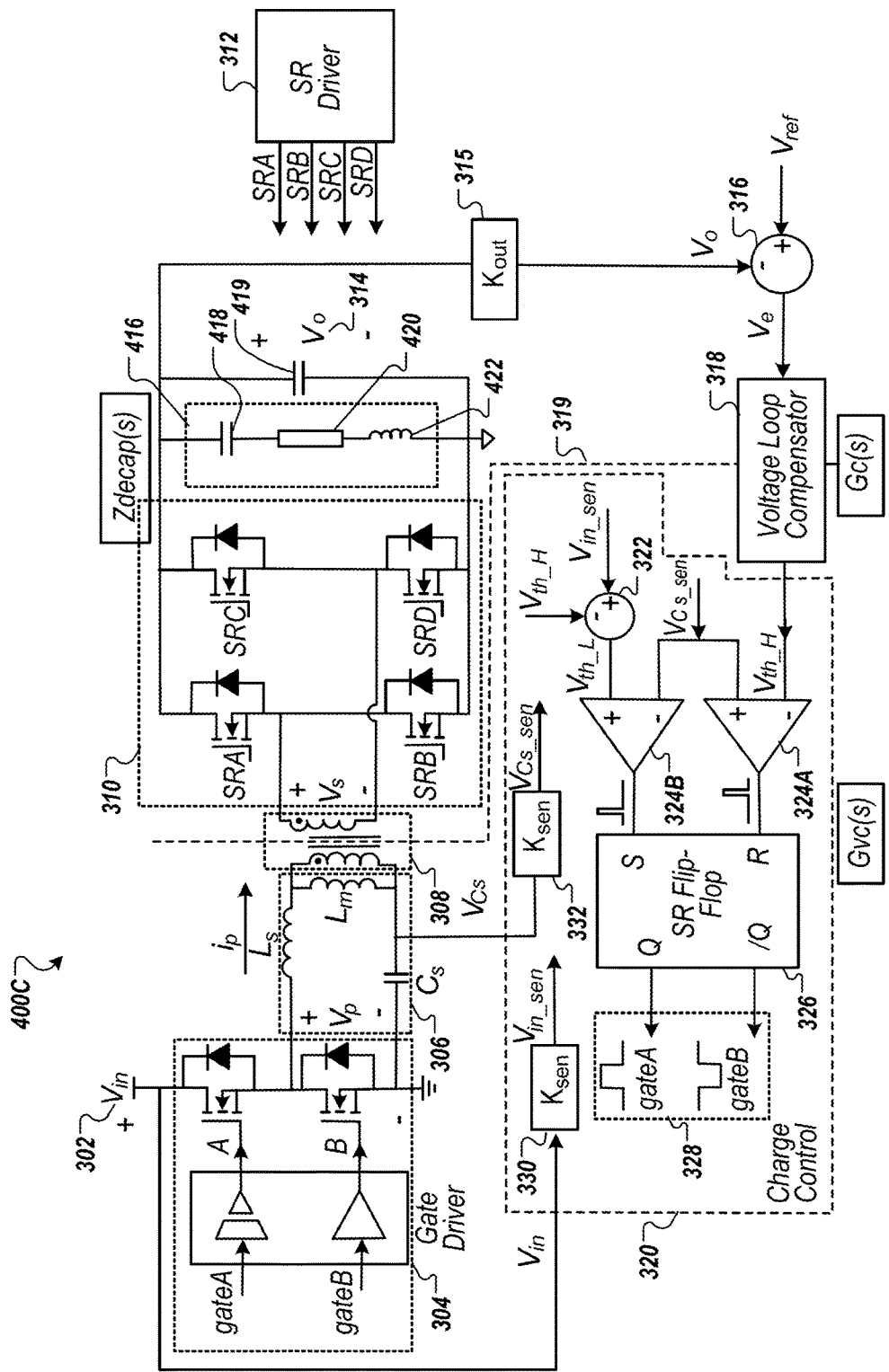

FIGS. 4A-4C are diagrams that illustrate different configurations of the resonant converter 300 of FIG. 3. Each of the FIGS. 4A-4C shows a different type of circuitry for suppressing output impedance spikes that can occur during switching applications of resonant converter 300 when used in a switch-mode power supply.

Referring to FIG. 4A, converter 300 of circuit 400A includes a notch filter 402 that receives differential voltage signal $V_e$. Notch filter 402 can be tuned to the switching frequency (or relative to the switching frequency, e.g., +/−10% of $f_{sw}$) to reduce output impedance spikes that are measured as $Z_{out}$ during instances where a switching frequency of resonant circuit 306 approaches $f_{sw}$. For example, respective signals received at transistor gate A and/or transistor gate B can be used to obtain the switching frequency of resonant converter 300 based on tuning of the notch filter 402.

For example, these respective signals can be used to implement or drive a timer device 404. In some implementations, timer device 404 can be a counter that counts a particular number of clock cycles. Alternatively, timer device 404 can be a resistor capacitor (RC) timer that uses a voltage or current source for charging the capacitor. Based on the voltage of the capacitor and using the equation of current*time=capacitance*voltage (I×T=C×V), a known capacitance, voltage, and current can be used to calculate a time.

In some implementations, notch filter 402 can be implemented using an example amplifier circuit, such as an operational amplifier (Op Amp) or high-speed amplifier. In general, notch filter 402 is configured to filter, or otherwise reject, a particular interference frequency that corresponds to the impedance spikes described above. For example, the closed-loop output impedance spikes can have a frequency and magnitude characteristic that represent signal interference and notch filter 402 can be tuned to filter, or suppress, these interfering signal spikes.

Notch filter 402 can be configured to perform signal filtering operations based on a particular transfer function, $$\frac{s^2 + N_1 \cdot s + N0}{s^2 + D_1 \cdot s + D0}.$$

For this transfer function, the ratio of $$\frac{N_1}{D_1}$$

can be selected to control a notch depth for filtering a particular interfering signal. For example, the notch depth can correspond to a certain signal width (e.g., in Hz) and a certain signal magnitude (e.g., in decibels (dB) for sufficiently notching, suppressing, or otherwise filtering interfering spikes or signals. In some implementations, larger values for D1 and lower values for N1 result in larger notch filtering depths (e.g., notch magnitude), but also results in narrowing the width the notch function. In one example application, $$\frac{N_1}{D_1} = \frac{1}{40}$$

can provide an adequate ratio for notching operations depending design requirements. In some implementations, use of notch filter 402 can result in a reduction of the magnitude of the interfering signal by at least 20 dB.

Referring now to FIG. 4B, circuit 400B includes circuitry for implementing a zero-order hold (ZOH) signal processing scheme to suppress impedance spikes at an output of resonant converter 300. Circuit 400B includes a signal sampling block 406 that receives voltage signal $V_e$ and a clock signal (CLK_OUT) for controlling a sampling and ZOH function of sampling block 406. As shown at FIG. 4B, the respective input signals received at SR flip-flop 326 (e.g., for controlling the Set/Reset (SR) functions) can be used to generate a trigger input signal (TRIG) to a clock generator 408. In some implementations, a frequency of a signal for the Set function and a signal for the Reset can be set to the switching frequency $f_{sw}$.

An OR gate 414 processes the respective signals for the Set and Reset functions into a trigger signal having a signal frequency that is two times $f_{sw}$ ($2 \ast f_{sw}$). The CLK OUT signal generated by clock generator 408 is also two times $f_{sw}$ and is provided to sampling block 406 as a clock signal for controlling signal sampling and ZOH functions of block 406. In circuit 400B, the output voltage $V_e$ of loop compensator 318 will be sampled and held twice in every switching cycle. In other words, a sampling rate of the sample and hold (S&H) function of sampling block 406 will be set at $2 \ast f_{sw}$. The S&H function includes an aliasing effect that translate to a filtering effect that is realized at $f_{sw}$ to filter certain output impedance signal characteristics that occur at converter operating frequencies near $f_{sw}$. Hence, sampling block 406 can be tuned based on the switching frequency $f_{sw}$ to reduce output impedance spikes measured as $Z_{out}$ during switching operations where switching frequency of resonant circuit 306 approaches $f_{sw}$.

Referring now FIG. 4C, circuit 400C includes circuitry for implementing a decoupling network 416 to suppress impedance spikes at an output of resonant converter 300. The decoupling network 416 can have a resonant frequency at or near (e.g., with 10%, within 5%, etc.) of the switching frequency, $f_{sw}$, and can so can act as a filter to reduce noise at or near the switching frequency.

The decoupling network 416 may include one or more components. The decoupling network 416 may be connected in parallel with the load. The decoupling network 416 can be implemented using integrated components or discrete components. For example, decoupling network 416 can be implemented using discrete components, where the components can be capacitor 418, a resistor 420, and inductor 422. These components, connected in series, may be placed in parallel with a decoupling capacitor 419 at an output of resonant converter 300.

In some implementations, the decoupling network 416 can be implemented with a single capacitor or with multiple capacitors that each individually have appropriate resonance properties, selected based on particular design requirements. A capacitor can be considered to have a certain amount of resistance and inductance, e.g., as parasitic or series equivalent characteristics of the capacitor. A capacitor with the appropriate amount of equivalent resistance and inductance can have resonant characteristics of the decoupling network 416 illustrated. Thus, the illustrated capacitor 418, resistor 420, and inductor 422 (collectively decoupling network 416) can be implemented as a multilayer ceramic chip capacitor (MLCC), which may be a capacitor 418 that has an internal series resistance 420 and series inductance 422 that produce resonance or filtering at or near the switching frequency $f_{sw}$ of the resonant converter.

For example, network 416 can be an MLCC that has an equivalent series resistance (ESR) and an equivalent-series inductor (ESL) as the resistor 420 and inductor 422, respectively. The signal conditioning functions enabled by the appropriately selected MLCC allows the network 416 to achieve a filtering effect which lowers closed-loop output impedance of the converter 300 at the switching frequency. For example, capacitor 418 can be selected to have a self-resonant frequency (e.g., the resonant frequency resulting from the certain capacitance 418 and ESL 422) that is sufficiently close to the switching frequency $f_{sw}$ to attenuate signals at the switching frequency $f_{sw}$ by at least a minimum amount, e.g., 3 dB, 10 dB, 20 dB, etc. Hence, in the implementation of circuit 400C, the charge mode control scheme described above remains largely the same as discussed with respect to FIG. 3, while the presence of the output decoupling network 416 reduces closed-loop output impedance, e.g., as signals at the load of the resonant converter 300 approach $f_{sw}$.

FIGS. 4A-4C each describe a different technique for lowering closed-loop output impedance of the resonant converter 300. Each of these techniques can be used individually, as illustrated in the respective figures, or combinations of these techniques can be used. For example, a resonant converter 300 may include a filter as shown in FIG. 4A, circuitry implementing a zero-order hold or other sampling technique as shown in FIG. 4B, and a resonant decoupling network as shown in FIG. 4C. Any sub-combination of these techniques can also be used. Combinations of the techniques shown in FIGS. 4A-4C can together increase the stability of the control loop and reduce closed-loop output impedance more than individual techniques used alone. Further, since the cumulative effect of the various techniques is additive in suppressing output impedance spikes, the use of multiple techniques can allow for appropriate tradeoffs. For example, if at least 20 dB of attenuation is desired for signals at $f_{sw}$ in the control loop, this may be achieved by a combination or subcombination of in-loop filters, decoupling networks, and/or sampling holds to achieve the appropriate signal attenuation, and thus avoid an output impedance spike. Similarly, as the various techniques may have somewhat different effects on different frequencies of signals, a combination of the techniques can provide an appropriate attenuation effect over a wider range of signals.

Figure 5:
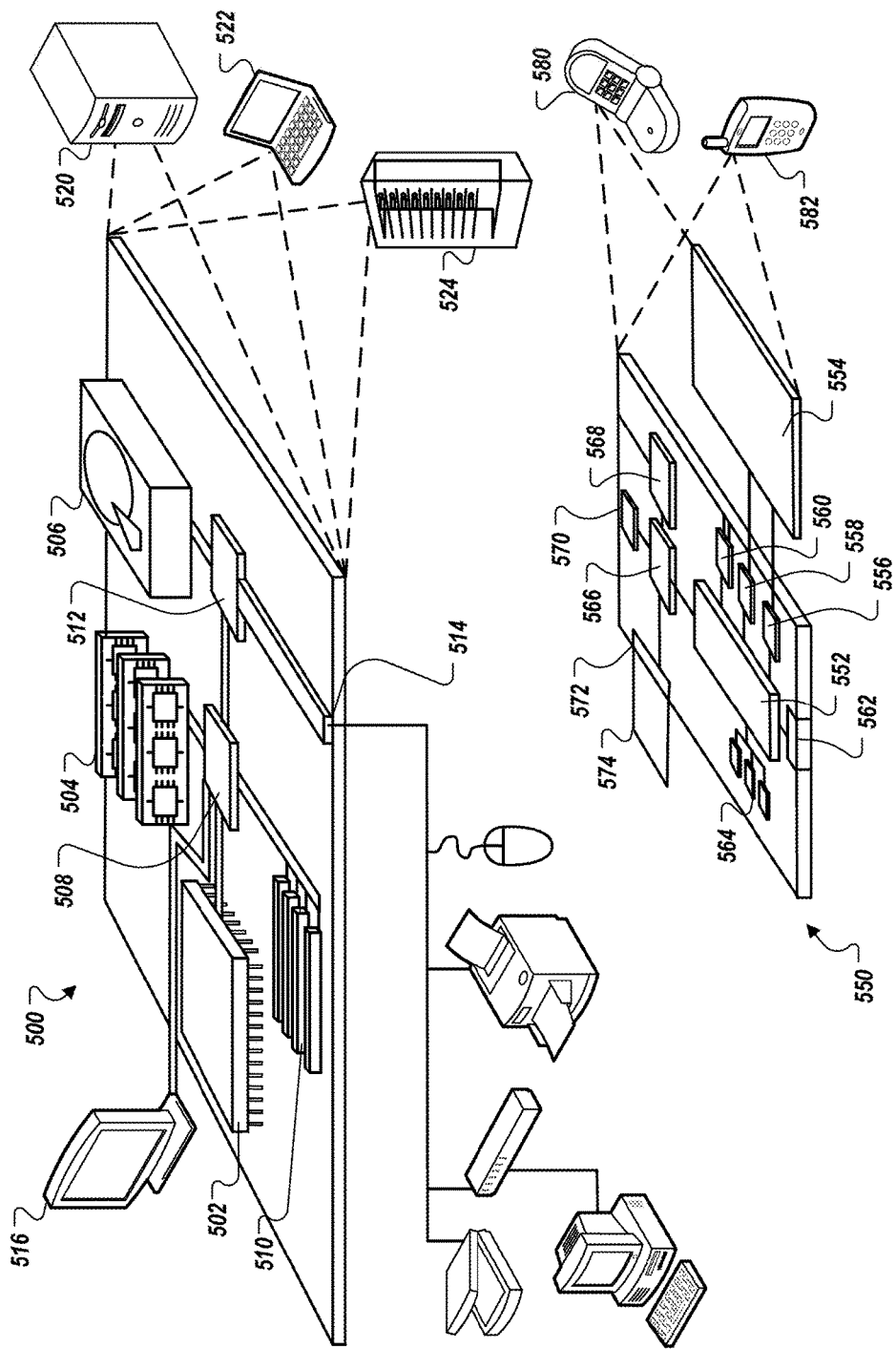
FIG. 5 is a block diagram of a computing system that can be used in connection with computer-implemented methods described in this document.

FIG. 5 is a block diagram of computing devices 500, 550 and systems and methods described in this document may be used to implement these devices, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface.

Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A device comprising:
   a voltage-regulated DC-DC converter comprising a switching network, a resonant circuit, and control circuitry, wherein the switching network has a switching frequency, and wherein the voltage-regulated DC-DC converter has an output impedance;
   wherein the control circuitry uses a control loop to control the voltage-regulated DC-DC converter, the control circuitry implementing the control loop using:
      an output voltage sensor configured to sense an output voltage of the voltage-regulated DC-DC converter; and
      a compensator configured to adjust operation of the voltage-regulated DC-DC converter based on the output voltage sensed by the output voltage sensor; and
   wherein the voltage-regulated DC-DC converter comprises an output impedance suppression mechanism configured to at least partially suppress increases in the output impedance of the voltage-regulated DC-DC converter.

2. The device of claim 1, wherein the output impedance suppression mechanism is configured to at least partially compensate for an output impedance spike occurring at the switching frequency.

3. The device of claim 1, wherein the output impedance suppression mechanism comprises a notch filter in the control loop, the notch filter being tuned for the switching frequency.

4. The device of claim 3, wherein the output impedance suppression mechanism comprises an operational amplifier and an impedance network that provide the notch filter for the control loop.

5. The device of claim 1, wherein the output impedance suppression mechanism comprises a zero-order hold mechanism.

6. The device of claim 5, wherein the zero-order hold mechanism is configured to operate at a sampling rate of about twice the switching frequency.

7. The device of claim 1, wherein the output impedance suppression mechanism comprises a decoupling network arranged in parallel with an output load of the voltage-regulated DC-DC converter, wherein the decoupling network has a resonant frequency within 10% of the switching frequency.

8. The device of claim 7, wherein the decoupling network comprises a capacitor having a self-resonant frequency within 10% of the switching frequency due to a capacitance of the capacitor and an equivalent series inductance of the capacitor.

9. The device of claim 1, wherein the resonant circuit is an LLC tank.

10. The device of claim 1, wherein the resonant circuit is an LC or LLCC resonant circuit.

11. The device of claim 1, wherein the compensator comprises a proportional-integral (PI) controller or a proportional-integral-derivative (PID) controller.

12. The device of claim 1, wherein the voltage-regulated DC-DC converter has a closed loop bandwidth that is about ⅓ of the switching frequency of the switching network and a phase margin of at least 45 degrees.

13. The device of claim 1, wherein the resonant circuit has a resonant frequency that is within 15% of the switching frequency of the switching network.

14. The device of claim 1, wherein the control circuitry for the voltage-regulated DC-DC converter implements charge control that controls switching of the switching network components based on a voltage of a capacitor of the resonant circuit.

15. The device of claim 1, wherein the control circuitry controls the switching network to output a pulsed output to the resonant circuit;
   wherein the resonant circuit is an LLC tank;
   wherein the capacitor is a capacitor of the LLC tank; and
   wherein the control circuitry is configured such that, at switching times for MOSFETs in the voltage-regulated DC-DC converter, the voltage of the capacitor directly controls per-cycle input charge to the capacitor.

16. The device of claim 1, wherein the switching network comprises a switching rectifier operating at the switching frequency.

17. The device of claim 1, wherein the output impedance suppression mechanism is configured to at least partially suppress frequency-related increases in the output impedance of the voltage-regulated DC-DC converter.

18. The device of claim 1, wherein the output impedance suppression mechanism is configured to suppress increases in the output impedance of the voltage-regulated DC-DC that occur as changes in load demands approach the switching frequency of the switching network.

19. A device comprising:
a voltage-regulated DC-DC converter comprising:
a pulse-generating circuit configured to receive a DC input and provide a pulsed output;
an LLC tank coupled to receive the pulsed output;
a transformer having a primary coil and a secondary coil, the transformer being coupled to receive a signal from the LLC tank at the primary coil and output a signal at the secondary coil;
a switching rectifier having a switching frequency, configured to convert the signal output at the secondary coil to a DC voltage;
control circuitry configured to regulate the voltage output of the voltage-regulated DC-DC converter, wherein the control circuitry uses a voltage-mode feedback control loop using:
an output voltage sensor configured to sense an output voltage of the voltage-regulated DC-DC converter; and
a compensator configured to adjust operation of the voltage-regulated DC-DC converter based on the output voltage sensed by the output voltage sensor;
wherein the voltage-regulated DC-DC converter comprises an output impedance suppression mechanism configured to at least partially suppress increases in the output impedance of the voltage-regulated DC-DC converter.

20. The device of claim 19, wherein the pulse-generating circuit comprises a half-bridge or full-bridge configuration of MOSFETs configured to generate a pulsed output in response to control signals from the control circuitry,
wherein the control circuitry uses the voltage-mode feedback control loop to adjust parameters that drive the MOSFETs of the pulse-generating circuit.

21. The device of claim 19, wherein the output impedance suppression mechanism is configured to at least partially compensate for an output impedance spike occurring at the switching frequency.

22. A method comprising:
receiving a DC input to a voltage-regulated DC-DC converter comprising a switching network, a resonant circuit, and control circuitry, wherein the switching network has a switching frequency, and wherein the voltage-regulated DC-DC converter has an output impedance;
regulating voltage output of the voltage-regulated DC-DC converter using a control loop by sensing an output voltage of the voltage-regulated DC-DC converter and adjusting operation of the voltage-regulated DC-DC converter based on the output voltage sensed by the output voltage sensor; and
using an output impedance suppression mechanism to at least partially suppress increases in the output impedance of the voltage-regulated DC-DC converter.

* * * * *